Figure 1:
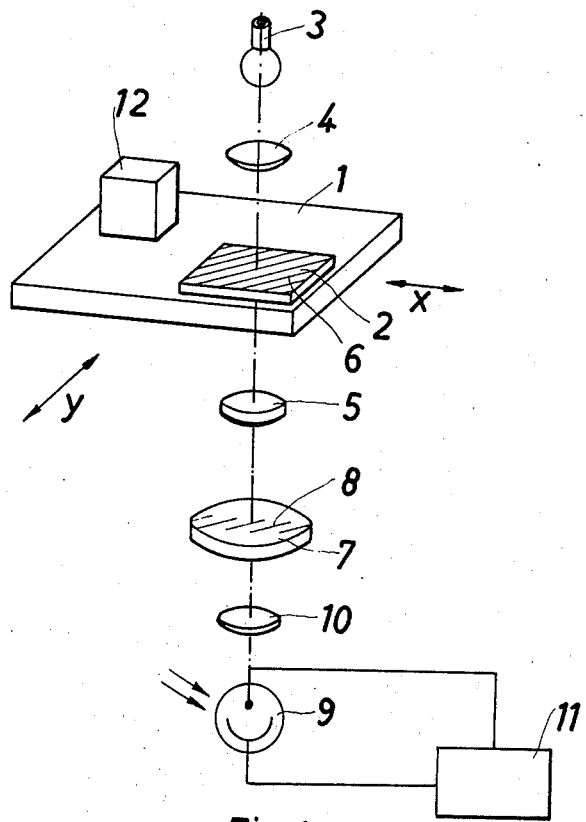

United States Patent [19]
Grey et al.

[11] 3,791,742
[45] Feb. 12, 1974

[54] COORDINATE POSITION MEASURING BY IMAGING A MOVABLE GRATING ONTO A PARALLEL REFERENCE GRATING

[75] Inventors: Udo Grey; Winfried Klimmer, both of Jena-Neulobeda, Germany

[73] Assignee: Jenoptik Jena G.m.b.H., Jena, Germany

[22] Filed: Mar. 6, 1973

[21] Appl. No.: 337,359

[52] U.S. Cl............... 356/169, 356/170, 250/237 R
[51] Int. Cl........................................... G01b 11/14
[58] Field of Search... 356/156, 169, 170, 171, 172; 250/237 R, 237 G

[56] References Cited
UNITED STATES PATENTS

| | | |
|---|---|---|
| 3,723,748 | 3/1973 | Coburn et al................. 250/237 G |
| 3,403,392 | 9/1968 | Wogatzke...................... 250/237 R |
| 3,600,811 | 8/1971 | Weyrauch...................... 356/169 X |

*Primary Examiner*—Ronald L. Wibert
*Assistant Examiner*—Paul K. Godwin

[57] ABSTRACT

In order to position a slide relative to two coordinate directions, two gratings are used, the rules thereon being parallel to each other and non-parallel to neither of the coordinate directions and in which one of the gratings is integral with said slide.

The rules on the one grating are opaque whereas those on the other grating are transparent.

When the rules of the gratings coincide in the course of imaging the gratings on each other, signals will be derived at subsequent photocells.

4 Claims, 2 Drawing Figures

COORDINATE POSITION MEASURING BY IMAGING A MOVABLE GRATING ONTO A PARALLEL REFERENCE GRATING

This invention is concerned with a device for positioning slides in at least one coordinate direction, particularly for precision measuring apparatus and coordinate measuring systems. Such a device may be utilized, for example in industries concerned with semiconductors.

In a known coordinate measuring system for measuring the relative Cartesian coordinates of points in, on or along an object, a transport carries two measuring gratings, the rules on which being associated to and stand perpendicular on the respective coordinates, wherein the rules on one grating being at right angles to the rules on the other grating. The device further includes an object support which may be precisely adjusted by movements of a transport into a predetermined position, the measuring point of which is defined by the rules on the measuring gratings relative to the coordinate system.

Each measuring grating is associated to a reference grating, the rules on which are parallel to those of the associated measuring grating.

Each measuring grating and associated reference grating include an illumination optical system, an imaging optical system and light-sensitive elements.

Such a device is disadvantageous because each coordinate direction requires a measuring grating, a reference grating, an imaging and illumination optical system, and light-sensitive elements of its own.

Furthermore, unduly high adjustment efforts are involved to have the gratings in register with the respective coordinate direction, since precision instruments in particular require an accurate angular alignment of the gratings.

Another known device for automatically positioning cross-slides relative to two coordinate directions employs one measuring grating for each coordinate direction, comprising illumination, imaging and scanning means.

In order to position the slide in the coordinate directions, the associated measuring grating is scanned through a reticle diaphragm.

The essential drawback of such a device results from the two required measuring gratings, which have to be produced with high precision and which have to be adjusted relative to the coordinate directions.

However, the use of a reticle diaphragm involves additional interference pulses in the course of the positioning operation, which will move the stage to erroneous positions.

With a known optical measuring device, at least one oscillating luminescent light spot is visually or opto-electronically indicative of the position of an object.

The oscillating light spot is projected onto the plane of a reflector, mounted on a stage and provided with crossing lines, which are inclined relative to the direction of displacement.

One set of lines on the reflector is associated to a respective direction of displacement.

Two crossing marks located in special adjustment rings are angularly and crossingly adjustable relative to each other, thus forming the scanning marks.

By the use of scanning marks which are crossing each other interference pulses arrive at the opto-electronical detectors. Furthermore, the production of reflectors having crossing lines is complicated and involves high costs.

It is an object of this invention to obviate the above disadvantages.

It is a further object of this invention to reduce the expenditures arising from the production and the adjustment of a device for positioning slides.

It is still a further object to provide a device for positioning slides relative to at least one coordinate direction, in which the positioning of the slide is considerably simplified by an advantageous embodiment and interference pulses responsible for erroneous opto-electronical detection are eliminated, and a high positioning precision may be obtained.

Accordingly, the present invention is concerned with a device for positioning a slide in at least one coordinate direction including a measuring grating, representing the scale and being integral with the slide to be positioned, said measuring grating being illuminated by means of an illumination optical system, and being imaged by means of an imaging optical system onto a slit diaphragm, and the images of said measuring grating and said slit diaphragm being in turn projected onto opto-electronical detectors, characterized in that said measuring grating and said slit-diaphragm are arranged in such a manner that the parallel rules on said measuring grating and the slits of said slit diaphragm include an angle of 45° relative to the direction of displacement of the slide.

The device of the present invention considerably simplifies the production of the measuring grating and the adjustment thereof relative to the slide.

Only an angular orientation of one grating relative to the coordinate direction of the slide has to be carried out.

Furthermore, only one illumination light source, and respective optical system, and one imaging optical system are required for positioning the slides in at least one coordinate direction. Interference pulses are eliminated at the subsequent opto-electronical detectors by utilizing a slit diaphragm, exhibiting no crossing lines or crossing slits, thus avoiding inaccurate results in the course of the positioning operation.

Figure 2:
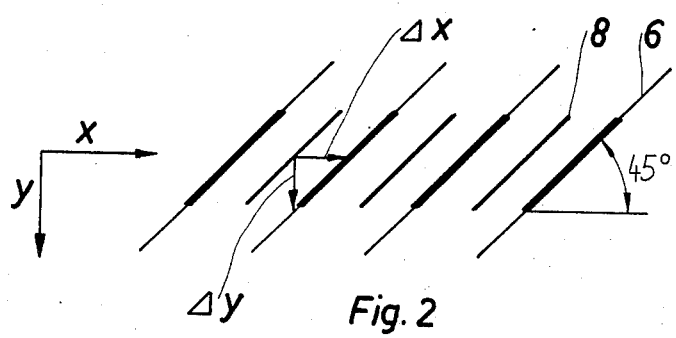

In order that the invention may be more readily understood, reference is made to the accompanying drawings which illustrate diagrammatically and by way of example one embodiment thereof, and in which FIG. 1 is a schematic perspective view of a cross slide positioning device, and FIG. 2 an enlarged schematic view of the rules on a measuring grating and of a slit diaphragm.

A device for positioning a displaceable cross-slide 1 along two coordinate directions $x$ and $y$ comprises a measuring grating 2, an object 12, both mounted on the cross-slide 1, an illumination system, including a light source 3 and an illumination optical system 4, and an imaging optical system 5 adapted to image opaque rules 6 of the measuring grating 2 in the plane of a slit diaphragm 7 (reference grating). The slit-diaphragm 7 (reference grating) is disk-shaped and is provided with transparent rules 8.

The measuring grating 2 and the slit diaphragm 7 are arranged relative to the two coordinate directions $x$ and $y$ (FIG. 1) in such a manner that the rules 6 of the measuring grating 2 and the slits 8 of the slit diaphragm 7 on the one hand, and the coordinate directions on the other hand include an angle of 45°.

Preferably, a second imaging optical system 10 is inserted into the path of rays of the positioning device, in order to project the slit-diaphragm 7 (reference grating) and the image of the measuring grating 2 onto at least one opto-electronical detector 9.

In FIG. 2 the position of the rules 6 in the plane of the slit diaphragm 7 (reference grating) and the position of the transparent rules 8 of the slit diaphragm 7 (reference grating) are shown on an enlarged scale. The spaces designated by $\Delta x$ and $\Delta y$ between the transparent rules 8 in the $x$ and $y$ directions are equal and are indicative of the measurable way of displacement. Such an arrangement of the rules 6 on the grating and the transparent rules 8 permits the use of only one measuring grating 2 and one slit diaphragm 7 (reference grating) to ensure a precise positioning of the cross-slides in the x direction as well as in the y direction. The electrical signals derived from the detectors 9 are fed into a signal processing means 11 for subsequent processing.

The device according to the invention is not restricted to embodiments in which the measurable way of displacements designated by $\Delta x$ and $\Delta y$ are identical. $\Delta x$ and $\Delta y$ may well assume different values, in other words, the rules 6 on the measuring grating 2 and the rules 8 on the slit diaphragm 7 (reference grating) may include an angle unlike 45° relative to the coordinate directions. Furthermore, the slit diaphragm 7 (reference grating) and the measuring grating 2 are mutually exchangeable. If required, the device permits an operation without the optical imaging systems 5 and 10.

With a further advantageous embodiment, the slide 1 may be non-displaceable, whereas the system constituted by the illumination system 3, 4 the imaging optical system 5, 10, the slit diaphragm 7 (reference grating) and the light-sensitive means 9 may be displaceably arranged.

We claim:

1. A device for positioning an object relative to at least two coordinate directions
    comprising
    a slide for carrying said object,
    a measuring grating having rules thereon being inclinedly oriented relative to said coordinate directions,
    a reference grating, being arranged in a plane and being parallel and optionally conjugated to the plane of said measuring grating, and having rules thereon, oriented in parallel to the rules on said measuring grating,
    the one of the gratings having opaque rules,
    the other of the gratings having transparent rules,
    one of said gratings being non-displaceably secured to said slide,
    an illumination system adapted to illuminate one of said gratings,
    at least one light-sensitive means
        said gratings being located between said illumination system and said light-sensitive means,
        said optical illumination system,
        said gratings and said light sensitive means being in optical alignment to each other;
        the grating integral with said slide being jointly displaceable relative to the other grating, to said illumination system and to said light sensitive means in direction of both coordinates,
    and finally comprising signal processing means adapted to process signals derived from said light sensitive means.

2. A device as claimed in claim 1, wherein said rules and said coordinate directions include an angle of 45°.

3. A device as claimed in claim 1, further comprising a first optical imaging system adapted to image said gratings on each other and being arranged between said gratings.

4. A device as claimed in claim 3, still further comprising a second optical imaging system for at least partially imaging the two gratings onto said light sensitive means, said second optical imaging system being arranged between the two gratings and said light sensitive means.

* * * * *